(12) United States Patent
Wittig et al.

(10) Patent No.: US 11,077,640 B2
(45) Date of Patent: Aug. 3, 2021

(54) ADHESIVE TAPE WITH FINE-STITCH STITCH-BONDED WEB

(71) Applicant: Coroplast Fritz Müller GmbH & Co. KG, Wuppertal (DE)

(72) Inventors: Gülay Wittig, Bochum (DE); Guido Vorwerk, Warendorf (DE); Christoph Lodde, Holzwickede (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 298 days.

(21) Appl. No.: 14/757,692

(22) Filed: Dec. 23, 2015

(65) Prior Publication Data

US 2016/0176154 A1 Jun. 23, 2016

(30) Foreign Application Priority Data

Dec. 23, 2014 (DE) ...................... 10 2014 119 526.4

(51) Int. Cl.
*B32B 5/10* (2006.01)
*B32B 27/12* (2006.01)
(Continued)

(52) U.S. Cl.
CPC ................ *B32B 5/10* (2013.01); *B32B 5/022* (2013.01); *B32B 5/06* (2013.01); *B32B 25/08* (2013.01); *B32B 25/14* (2013.01); *B32B 27/08* (2013.01); *B32B 27/12* (2013.01); *B32B 27/26* (2013.01); *C09J 7/21* (2018.01); *B32B 2250/02* (2013.01); *B32B 2262/0253* (2013.01); *B32B 2262/0261* (2013.01); *B32B 2262/0276* (2013.01); *B32B 2262/0284* (2013.01); *B32B 2262/0292* (2013.01); *B32B 2262/04* (2013.01); *B32B 2272/00* (2013.01); *B32B 2307/102* (2013.01);
(Continued)

(58) Field of Classification Search
CPC ............... C09J 7/21; B32B 5/10; B32B 27/12
USPC .................................. 442/149, 150, 327, 151
See application file for complete search history.

(56) References Cited

U.S. PATENT DOCUMENTS

| | | | | |
|---|---|---|---|---|
| 5,496,603 A | * | 3/1996 | Riedel ..................... | D04H 1/46 428/41.5 |
| 6,436,528 B1 | * | 8/2002 | Kulper ..................... | C09J 7/38 428/343 |

(Continued)

FOREIGN PATENT DOCUMENTS

| | | |
|---|---|---|
| CN | 102965852 A | 3/2013 |
| DE | 10 2006 006 405 A1 | 8/2007 |

(Continued)

OTHER PUBLICATIONS

Search Report from corresponding French patent application No. 1553599 dated Feb. 27, 2018 ((5 pgs).

(Continued)

*Primary Examiner* — Peter Y Choi
(74) *Attorney, Agent, or Firm* — Dickinson Wright PLLC

(57) ABSTRACT

An adhesive tape, including a substrate including a stitched fleece and an adhesive layer applied one-side on the substrate, wherein the stitched fleece is formed from fibers, which are stitched with stitching yarns. A manually tearable adhesive tape is disclosed, with improved abrasion resistance properties together with a high noise damping. The stitching yarns may be stitched with a fineness of at least F24.

14 Claims, 2 Drawing Sheets

(51) Int. Cl.
  *B32B 5/06*    (2006.01)
  *B32B 27/08*   (2006.01)
  *B32B 25/14*   (2006.01)
  *B32B 27/26*   (2006.01)
  *B32B 25/08*   (2006.01)
  *B32B 5/02*    (2006.01)
  *C09J 7/21*    (2018.01)

(52) U.S. Cl.
  CPC ..... *B32B 2307/204* (2013.01); *B32B 2307/54* (2013.01); *B32B 2307/56* (2013.01); *B32B 2307/582* (2013.01); *B32B 2307/718* (2013.01); *B32B 2307/732* (2013.01); *B32B 2405/00* (2013.01); *C09J 2203/302* (2013.01); *C09J 2301/302* (2020.08); *C09J 2301/312* (2020.08); *C09J 2400/263* (2013.01); *C09J 2421/00* (2013.01); *C09J 2433/00* (2013.01); *C09J 2467/006* (2013.01)

(56) References Cited

U.S. PATENT DOCUMENTS

| | | | | |
|---|---|---|---|---|
| 6,451,146 B1 * | 9/2002 | Ganschow | ................ | C09J 7/21 156/164 |
| 6,555,730 B1 * | 4/2003 | Albrod | ................ | A61F 13/0273 428/295.4 |
| 6,630,227 B1 * | 10/2003 | Himmelsbach | ......... | B05B 12/24 428/156 |
| 2009/0139637 A1 * | 6/2009 | Kopf | ........................ | B32B 7/12 156/187 |
| 2009/0291303 A1 | 11/2009 | Kopf et al. | | |
| 2012/0227894 A1 | 9/2012 | Siebert et al. | | |

FOREIGN PATENT DOCUMENTS

| | | |
|---|---|---|
| DE | 102011005163 A1 | 9/2012 |
| EP | 0 668 336 B2 | 8/2001 |
| EP | 2128212 A2 | 12/2009 |

OTHER PUBLICATIONS

Vliesstoffe: Rohstoffe, Herstellung, Anwendung, Eigenschaften, Prüfung, 2., vollständig überarbeitete Auffage, Editiert durch H. Fuchs und W. Albrecht, Copyright 2012, Wiley-VCH Verlag GmbH & Co. KGaA, Weinheim, Kapitel 6: Vliesverfestigung, https://onlinelibrary.wiley.com/doi/pdf/10.1002/9783527645862.ch6 [recherchiert am 27.10.2020].

* cited by examiner

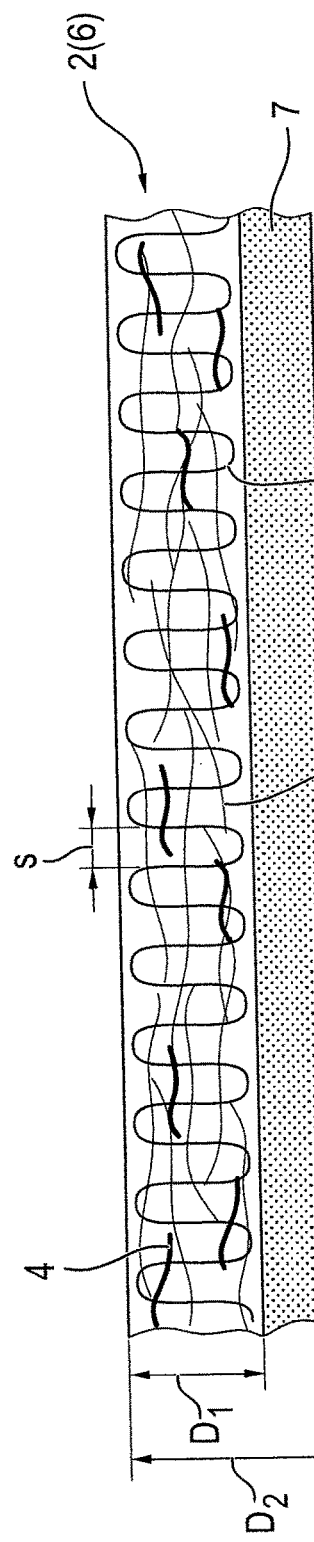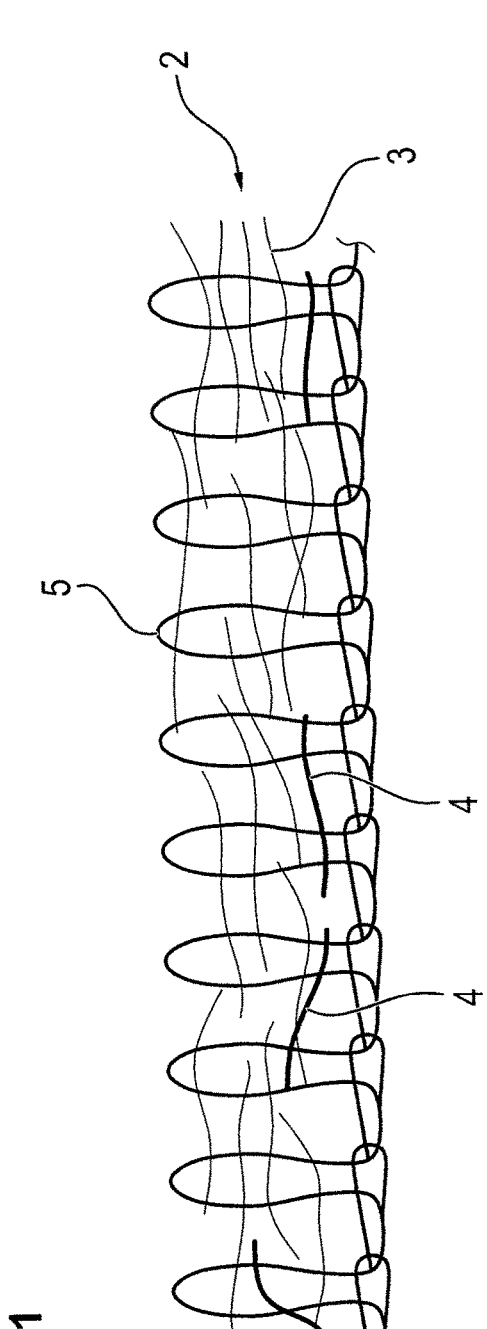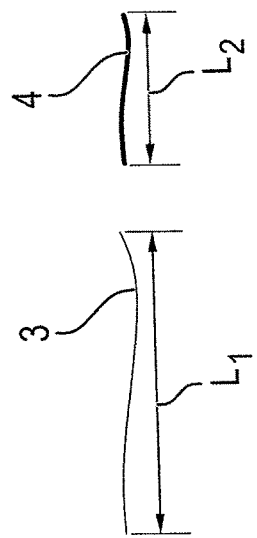
FIG. 1
FIG. 2a
FIG. 2b

ADHESIVE TAPE WITH FINE-STITCH STITCH-BONDED WEB

RELATED APPLICATIONS

This application claims priority to German Patent Application No. 10 2014 119 526.4, filed Dec. 23, 2014.

FIELD OF INVENTION

The invention relates to an adhesive tape having a substrate with a stitch-bonded web and a layer of adhesive applied to one side of the substrate, whereby the stitch-bonded web is formed from fibers that are sewn with sewing threads.

A stitch-bonded web refers to a textile fiber structure that includes several fiber layers that are stitched together by at least one sewing thread.

BACKGROUND

One adhesive tape with substrate formed from a stitch-bond web is, for example, known from EP 0 668 336 B2. Also known are adhesive tapes of the type mentioned above which are distributed under the product labels Coroplast 8550 and/or Coroplast 8551. The adhesive tape Coroplast 8550 is based on stitch-bonded web substrate with a surface weight of 80 g/m$^2$ and the adhesive tape Coroplast 8551 is based on a stitch-bonded web substrate with a surface weight of 65 g/m$^2$. This type of adhesive tape is suitable for wrapping cable sets in vehicles to, for example, avoid rattling noises. Rattling noises are caused, for example, by cables that come into contact with the vehicle body or other parts. Adhesive tapes of the kind mentioned must fulfill uniform standards regarding their performance characteristics, in particular standard LV 312 (10/2009). This standard classifies adhesive tapes in regard to their characteristics for applications in the automobile industry, particularly for the bundling and wrapping of cables and cable sets. The above-mentioned standard was developed by the representatives of the automobile manufacturers AUDI AG, BMW, Daimler AG, PORSCHE AG, and Volkswagen AG. When the standard LV 312 is mentioned in the following, it always refers to the corresponding version 10/2009.

The performance characteristics of adhesive tapes include for example the adhesive strength on the back of the tape and the force needed to unroll the tape, as well as the hand-tearability. Additional performance characteristics are the adhesive strength on certain materials, the thickness, elongation at break, the breaking strength, the tear resistance, and the abrasion resistance.

In order to avoid rattling noises, it is practical that the adhesive tapes exhibit noise damping. Depending on the area of use, adhesive tapes with different noise damping classifications are available.

The tear resistance is important for the robustness of the adhesive tape against mechanical strain. It is known that this factor can be improved by increasing the surface weight of the web or the application weight of the adhesive to the adhesive tape. In both instances, a resulting deterioration of noise damping of the adhesive tape is accepted.

BRIEF SUMMARY

The invention is based in part on the task of improving the performance characteristics of presently known adhesive tapes of the above mentioned type. In particular, a preferably hand-tearable adhesive tape with improved abrasion resistance that maintains high noise damping should be made available.

The task is accomplished according to the features of the characterizing part of claim 1. The fact that the fibers in the stitch-bonded web are sewn with sewing threads of a fineness of at least F 24, provides a better elongation at break and a better breaking strength for the adhesive band according to the intervention compared to the known adhesive tapes of the above mentioned type and the current state of the art.

The fineness F is a measure for stitch density and is indicated in unit n/25 mm, whereby n refers to the number of stitch-forming needles. The indication of fineness F is based on the "English fineness," which indicates the number n in the numbering system used for needles associated with an English inch (25.4 mm) for warp-knitting and knitting machines and thus indirectly indicates the stitch density. Here, the fineness F is standardized in the DIN ISO 8188: 2009-02 "Textile Machines and Accessories—Stitch-forming Machines."

In an advantageous embodiment of the invention, the sewing thread for the stitched-bonded web is sewn with fineness in the area of F 24 to F 28. Surprisingly, it has been shown that despite a smaller stitch density, easy hand tearability in accordance with the standard LV 312 is maintained compared to the known adhesive tapes. Improved adhesion on steel surfaces can also be achieved with the same or lesser adhesive application amounts. With at least consistently high noise damping, the abrasion characteristics also improve.

In particular, sewing threads with a stitch length in an area of 0.7 mm to 1.7 mm, preferably with a stitch length of 1.2 mm, can be sewn together in the stitched-bonded web. Stitch length refers to the distance between the entry point of the sewing thread 5 into the fiber structure and its exit point.

Advantageously, the sewing threads can possess linear density in the area of 20 dtex to 76 dtex, preferably in the area of 33 dtex to 50 dtex. Surprisingly, it has been shown that such low thread strength has the consequence that the adhesive tape has better adhesion to steel with, at the same time, reduced adhesion to the back of the band. The strength needed to unroll the adhesive tape from the adhesive tape roll can be lower compared to adhesive tapes with a larger thread size.

The thread material for the sewing thread can include partially or completely of textile fibers. For example, yarns can be used where yarns from staple fibers or filaments are used. A staple fiber yarn includes finite long fibers that are twisted during spinning. A filament yarn includes filaments. A filament is a fiber of unlimited length (in accordance with standard DIN 60000 (10/1990)) or that possesses a length of at least 1000 mm (in accordance with standard DIN 60001 (10/1990)). On the other hand, fibers of limited length are referred to as spinning fibers. Spinning fibers are divided in turn into actual spinnable staple fibers and very short flock fibers, whereby the limit is at 15 mm. Sewing thread 5 can also be manufactured from spinning fibers.

The manufacturing of filament yarn takes place through the swirling of individual filaments. Preferably, the sewing threads have filaments whose count is in the area of 30 to 48, preferably in the area of 34-38. In general, the sewing threads can contain 24 to 144 filaments.

For the sewing threads 5, smooth yarns are preferred, in particular so-called pre-oriented yarns (POY) or so-called fully drawn yarns (FDY).

Preferably, some of the sewing threads or all of the sewing threads can partially or completely made of polyester (PES). Polyester sewing threads are beneficial because they, for example, have low density, high toughness and tear-elongation, very good dielectric behavior, low water absorption, as well as low deterioration. In particular, it is possible that some of the sewing threads or all of the sewing threads are made partially or completely of polyethylene-terephthalate (PET).

However, sewing threads made of polyamide (PA) can also be used. This kind of sewing thread 5 is made partially or completely of homo-polyamides, e.g. PA 6.6 (PA from hexa-methylene-diamine and adipic-acid $[NH-(CH_2)_6-NH-CO-(CH_2)_4-CO]_n$) or PA 6 (PA from caprolactam $[NH-(CH_2)_6-CO]_n$). Homo-polyamides are derived from an amino carbon acid or a lactam and/or diamine and a di-carbon acid. Preferably, the sewing threads are made partially or completely of recycled polyester or polyethylene (PE) or polypropylene (PP) or polyurethane (PUR), or viscose.

Apart from that, it can be beneficial for the stitched-bonded web to have an elongation at tear in the area of 10% to 50%, in accordance with standard LV 312. Here, it has been shown that thinner stitched-bonded webs, e.g. with a surface weight of 65 g/m$^2$, with a higher fineness F, had the same elongation at tear compared to the known stitch-bonded web of the adhesive tape Coroplast 8551, whereas the elongation at tear for thicker stitched-bonded webs, e.g. with a surface weight of 80 g/m$^2$, is improved.

In particular, the stitch-bonded web can possess a breaking force in the area of 20 N/cm to 55 N/cm in accordance with the standard LV 312. Here, it has been shown that for thinner stitch-bonded webs, e.g. with a surface weight of 65 g/m$^2$, as well as thicker stitch-bonded webs, e.g. with a surface weight of 80 g/m$^2$, at a higher fineness F a higher breaking force can be achieved.

In particular the adhesion layer can exhibit an application weight in the area of 40 g/m$^2$ to 100 g/m$^2$. Preferably, the adhesive tape possesses an elongation at tear in the area of 17% to 28% in accordance with the standard LV 312. Thereby, it has been shown that the adhesive tape embodiment based on thinner stitch-bonded webs, e.g. with a surface weight of 65 g/m$^2$ at a higher fineness, possesses the same elongation at tear compared to the known adhesive tape Coroplast 8551. On the other hand, the elongation at tear for thicker adhesive tape embodiments based on a thicker stitch-bonded web, e.g. with a surface weight of 80 g/m$^2$, is improved compared to the known adhesive tape Coroplast 8550.

Furthermore, it can be beneficial that the adhesive tape has a breaking force in the area of 20 N/cm to 48 N/cm in accordance with the standard LV 312. It has also been shown that the adhesive tape embodiment based on thinner stitch-bonded webs, e.g. with a surface weight of 65 g/m$^2$ at a higher fineness possesses the same breaking force as compared to the known adhesive tape Coroplast 8551. On the other hand, the breaking force for thicker adhesive tape-embodiments based on thicker stitch-bonded webs, e.g. with a surface weight of 80 g/m$^2$, is improved compared to the known adhesive tape Coroplast 8550.

The adhesive tape in particular can exhibit an abrasion resistance in the area of class B to class C.

A favorable embodiment of the invention is that the stitch-bonded web is formed from long fibers and short fibers, whereby the share of the long fibers is in the area of 60% to 90%, preferably in the area of 60% to 80%, and the share of the short fibers is respectively in the area of 40% to 10%, preferably in the area of 40% to 20%.

The long fibers in particular possess a fiber length in the area of 60 mm to 120 mm, and the short fibers possess a fiber length in the area of 35 mm to 55 mm.

Preferably, the fibers possess linear density in the area of 2 dtex to 4 dtex.

It would be advantageous if the stitch-bonded web possesses a thickness in the area of 0.16 mm to 0.27 mm, in accordance with the standard LV 312.

Additional advantageous designs of the invention result from the following description of the figures and the conditional sub-claims.

BRIEF DESCRIPTION OF THE DRAWINGS

FIG. 1 is a schematic cross section of the inventive adhesive tape including the inventive stitch-bonded web, FIG. 2a is a schematized cross section of a possible embodiment of the inventive stitch-bonded web with long fibers, FIG. 2b is a view of a long fiber and a short fiber of the stitch-bonded web.

The same parts are marked with the same reference signs in the different figures of the drawings.

DETAILED DESCRIPTION OF THE DRAWINGS AND THE PRESENTLY PREFERRED EMBODIMENTS

Figure 3:
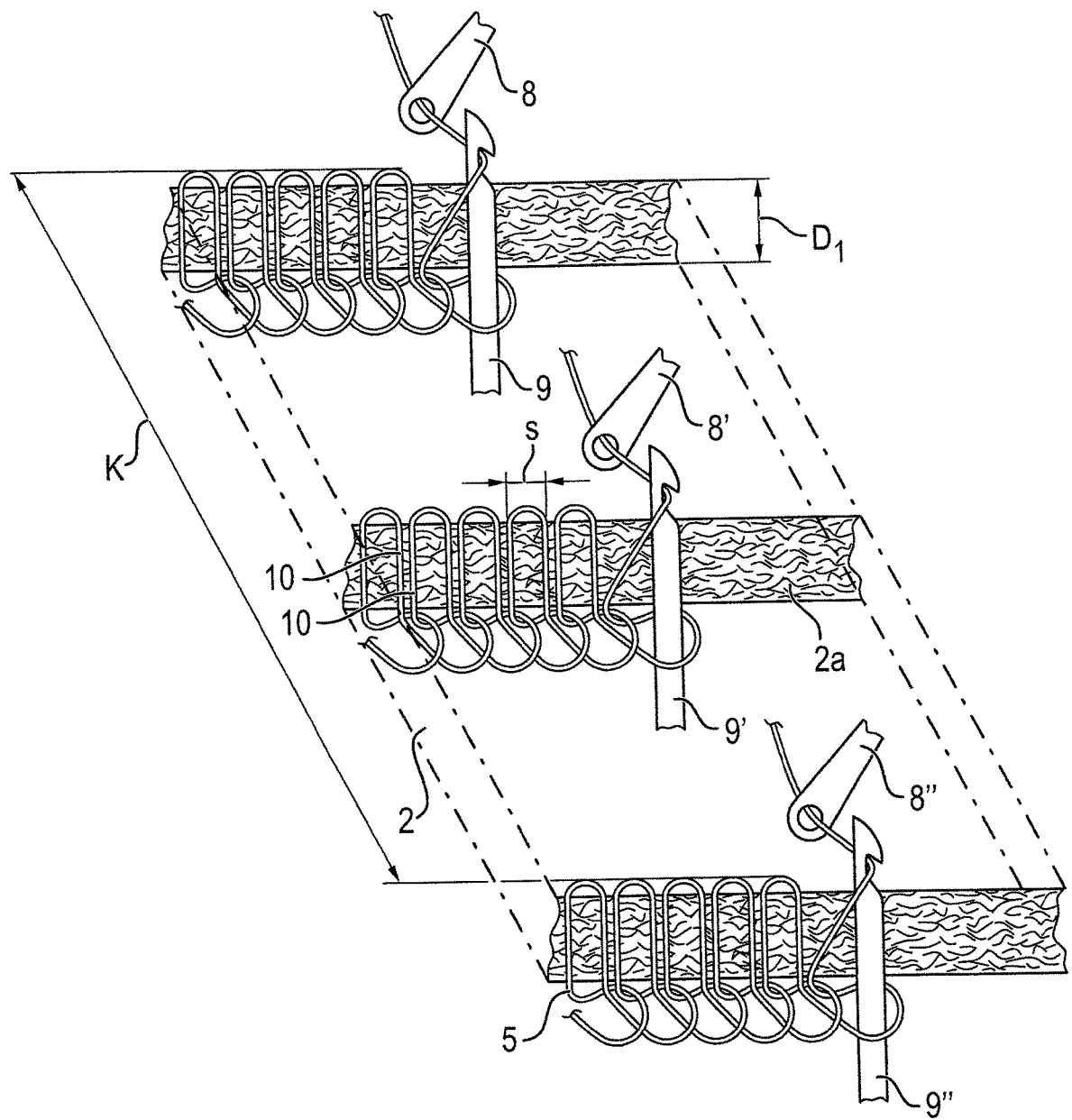
FIG. 3 is a view of the stitch-bonded web during manufacturing.

For the following description, it is claimed that the invention is not limited to the design examples and thereby is not limited to all or several characteristics of the described characteristic combination, but rather that each individual partial characteristic of the design example also functions separately from all other associated described partial characteristics on its own and also in combination with any characteristics of another design example relevant to the objective of the invention.

The characteristic parameters listed in the description of the stitch-bonded web 2 and the adhesive tape 1 are determined in accordance with the standard LV 312 (10/2009). For the stitch-bonded web 2, these parameters include the thickness D1, the elongation at tear, the breaking force, tear resistance, adhesion strength on the back of the tape, and air permeability. For adhesive tape 1, the parameters include the thickness D2, elongation at tear, breaking force, adhesion strength on steel, adhesion strength on the back of the tape, unwinding force, hand tearability, noise damping, and abrasion durability. For the last two parameters referring to adhesive tape 1, a further description follows in tables 1 and 2 that show the classification.

FIG. 1 shows an inventive adhesive tape 1, demonstrating a substrate 6 made of a stitch-bonded web 2 and an adhesive layer 7 applied to substrate 6 on one side. The stitch-bonded web 2 includes, preferably, a textile web material, which is a textile surface structure formed by a sequence and/or layering of organized and unorganized fibers 3 and 4. The web material can include longitudinal fibers along the direction of the tape and transverse fibers running transverse to the longitudinal fibers, or a completely randomly laid fiber arrangement.

According to the intervention, stitch-bonded web 2 has two types of fiber, meaning long fibers 3 and short fibers 4. The linear density of fibers 3 and 4 of both types is, in particular, in the area of 2 dtex to 4 dtex. For the formation of stitch-bonded web 2, the long fibers 3 and/or short fibers 4 are preferably sewn with sewing thread 5 that preferably features filaments having a count in the area of 30 to 40, preferred in the area of 34 to 38.

Preferably, the sewing threads 5 are sewn into the stitch-bonded web 2 with a stitch length s in the area of 0.7 mm to 1.7 mm, preferably with a stitch length s of 1.2 mm. The stitch-bonded web 2, in particular, has a surface weight in the area of 60 g/m2 to 82 g/m2. Furthermore, the stitch-bonded web 2 in particular has a thickness D1 in the area of 0.1 mm to 0.5 mm, preferably in the area of 0.16 mm to 0.27 mm. Advantageously, a portion of the fibers 3, 4 or all of the fibers 3, 4 are partially or completely made of synthetic material, preferably polyester (PES). Preferably, a portion of the fibers 3, 4 or all of the fibers 3, 4 partially or completely include polyethylene-terephthalate (PET). In particular, the fibers 3, 4 have a linear density in the area of 1 dtex to 5 dtex, preferably in the area of 2 dtex to 4 dtex. Advantageously, the stitch-bonded web 2 is formed of long fibers 3 and short fibers 4, whereby the share of long fibers 3 is the area of 60% to 90%, preferably in the area of 60% to 80%, and the share of the short fibers 4 respectively is in the area of 40% to 10%, preferably in the area of 40% to 20%. The length L1 of the long fibers 3 is preferably in the area of 60 mm to 120 mm and the length L2 of the short fibers 4 is preferably in the area of 35 mm to 55 mm.

The adhesive tape 1 that is manufactured with the invented stitch-bonded web 2 preferably has of a thickness D2 in the area of 0.25 mm to 0.35 mm, in particular in the area of 0.25 mm to 0.30 mm. Preferably, it hereby possesses noise damping in class C. This classification corresponds to a noise damping greater than 5 dB(A) up to and including 10 dB(A). An overview of the noise damping classification in accordance with standard LV 312 (10/2009) is shown in the following table.

TABLE 1 classification of noise damping characteristics in accordance with LV 312 (October 2009).

| Noise damping class | Requirement |
|---|---|
| A no noise damping | 0 to ≤2 dB(A) |
| B low noise damping | >2 to ≤5 dB(A) |
| C medium noise damping | >5 to ≤10 dB(A) |

TABLE 1-continued classification of noise damping characteristics in accordance with LV 312 (October 2009).

| Noise damping class | Requirement |
|---|---|
| D high noise damping | >10 to ≤15 dB(A) |
| E very high noise damping | >15 dB(A) |

Furthermore, the abrasion characteristics for adhesive tape 1 preferably correspond to the guidelines determined by the standard for class B or C. A corresponding overview regarding the abrasion characteristics in accordance with standard LV 312 (10/2009) is shown in the following table 2.

TABLE 2

Classification for abrasion characteristics in accordance with LV 312 (October 2009).

| Abrasion class | Requirement |
|---|---|
| A no abrasion protection | <100 strokes |
| B low abrasion protection | 100-499 strokes |
| C medium abrasion protection | 500-999 strokes |
| D high abrasion protection | 1000-4999 strokes |
| E very high abrasion protection | 5000-14,999 strokes |
| F extremely high abrasion protection | 15,000-29,999 strokes |
| G abrasion protection for special applications | >30,000 strokes |

The adhesive layer 7 of adhesive tape 1 preferably includes pressure-sensitive adhesives, in particular based on synthetic rubber. These types of adhesives are advantageous due to their high starting adhesion and their good adhesion to polar and non-polar surfaces (e.g. surfaces made of polypropylene and polyethylene). Furthermore, a UV-cross-linkable adhesive can be used as pressure-sensitive adhesive for the adhesive tape examples listed in table 4.

FIG. 2a shows a possible example of the invention for a utilized stitch-bonded web 2 on substrate 6. The characteristics of different design examples of this web 2 are displayed in the following table 3. The characteristics listed in this table are relevant to the invention individually on their own or in any combination. Furthermore, the characteristics of the different design examples are listed for comparison of two webs in accordance with the state of the art (third column and seventh column from the left of table 3). The label "PES Virgin" in table 3 for the material for fibers 3, 4 and the sewing yarn 5 hereby means that fibers 3, 4 and the stitching yarn 5 are preferably partially or completely made of a non-recycled polyester (PES).

TABLE 3

Overview of substrate materials

| | | 65 g/m² standard | Construction 1 | Construction 2 | Construction 3 | 80 g/m² standard | Construction 4 |
|---|---|---|---|---|---|---|---|
| Fineness | n/25 mm | F 22 | F 24 | F 28 | F 28 | F 22 | F 28 |
| Yarn strength | dtex | 50 | 50 | 33 | 50 | 50 | 50 |
| Filament count | number | 36 | 36 | 36 | 36 | 36 | 36 |
| Stitch length | mm | 1.2 | 1.2 | 1.2 | 1.2 | 1.2 | 1.2 |
| Yarn material | — | PES virgin | PES virgin | PES virgin | PES virgin | PES virgin | PES virgin |
| Fiber material | — | PES virgin | PES virgin | PES virgin | PES virgin | PES virgin | PES virgin |
| Fiber fineness long-fiber | dtex | 2.1 | 2.0-4.0 | 2.0-4.0 | 2.0-4.0 | 2.0-4.0 | 2.0-4.0 |

TABLE 3-continued

Overview of substrate materials

| | | 65 g/m² standard | Construction 1 | Construction 2 | Construction 3 | 80 g/m² standard | Construction 4 |
|---|---|---|---|---|---|---|---|
| Fiber fineness short-fiber | dtex | 3.3 | 2.0-4.0 | 2.0-4.0 | 2.0-4.0 | 2.0-4.0 | 2.0-4.0 |
| Long fiber proportion | % | 60-80 | 60-80 | 60-80 | 60-80 | 60-80 | 60-80 |
| Short fiber proportion | % | 40-20 | 40-20 | 40-20 | 40-20 | 40-20 | 40-20 |
| Fiber length long-fiber | mm | 76 | 60-120 | 60-120 | 60-120 | 60-120 | 60-120 |
| Fiber length short-fiber | mm | 51 | 35-55 | 35-55 | 35-55 | 35-55 | 35-55 |
| Grammage | g/m² | 65 +/− 5 | 65 +/− 5 | 65 +/− 5 | 65 +/− 5 | 84 +/− 5 | 84 +/− 5 |
| Thickness | mm | 0.175 +/− 0.015 | 0.175 +/− 0.015 | 0.175 +/− 0.015 | 0.175 +/− 0.015 | 0.24 +/− 0.03 | 0.24 +/− 0.03 |
| Elongation at break | % | 15-25 | 15-27 | 10-20 | 15-30 | 15-42 | 20-50 |
| Breaking force | N/cm | 27-42 | 30-55 | 20-35 | 40-55 | 30-42 | 35-55 |
| Tear resistance | mN | MW 13,000 | MW 15,000 | MW 8,000 | MW 18,000 | MW 13,000 | MW 18,000 |
| Air permeability | l/m² *s | 2500-3000 | 2400 | 2000 | 1800 | 3000 | 1800 |

According to the invention stitching yarns 5 having a fineness of at least F 24 are sewn in the stitched fleece 2. An illustration of the "English fineness," which specifies the number n of sewing needles 9, 9', 9" allocated to the distance K of an English inch (25.4 mm), and thus the stitch density, is shown in FIG. 3. Here in the schematically depicted stitched fleece 2, n=3, for example, needles 9, 9', 9" were used over a distance K for manufacturing the stitched fleece 2.

For example, for manufacturing a stitched fleece 2, two sewing-yarn systems (i.e., two bars) are used to form stitches through a raw fleece 2a. However, one-bar or three-bar systems are also possible. With the two-bar system a stitching yarn 5 is guided by a first set of movable sewing-yarn guides 8, 8', 8", which are supported by a first guide bar (not shown), for an interacting, complete yarn engagement with the needles 9, 9', 9", etc. over the width of the raw fleece 2a.

To produce the stitches in the stitched fleece 2, in operation the stitching yarns 5 are moved in engagement with the needles 9, 9', 9", which in turn guide the sewing yarns 5 in a back-and-forth manner through the raw fleece 2a. An arrangement of interacting stitching-yarn stitches 10 is thereby formed, which extend in rows, spaced with respect to one another, along the raw fleece 2a.

In a solely exemplary and non-limiting manner the interacting sewing-yarn stitches 10 can be held in a complete chain-stitch configuration, although other known stitch arrangements, e.g., tricot stitches and the like, can also be used.

In particular, the stitched fleece 2 can be produced using the stitch-bonding technology "Maliwatt." According to the Maliwatt method, a raw fleece 2a is strengthened by it being configured as an introduced crosswise plaited fibrous web or a tangled fleece sewn by one or two yarn systems. For this purpose a compound-needle/closingwire system pierces the fibrous web, and during the backward movement pulls one or two of the placed stitching yarns 5 through the to-be-strengthened raw fleece 2a. The reducing of the previous stitches and the withdrawal of the product downward follow.

In a first embodiment of the stitched fleece 2, the fibers 3, 4 are stitched with stitching yarns 5 having a linear density of 50 dtex and having a fineness of F 24. In this embodiment the grammage of the stitched fleece 2 falls in a range between 60 g/m² and 70 g/m². Furthermore, this embodiment of the stitched fleece 2 has an elongation at break in a range of 12% to 30%, preferably in a range of 15% to 27%, and a breaking force in a range from 25 N/cm to 60 N/cm, preferably in a range from 30 N/cm to 55 N/cm. Here the breaking force is a measure for the loadability of the adhesive tape 1 during use. The elongation at break is a measure for the elasticity of the adhesive tape 1. The tear resistance falls in a range of 8,000 mN to 18,000 mN, preferably having a value of 15,000 mN. The tear resistance or the notch resistance is the property of a material to not tear further even with the presence of a notch. Furthermore, the air permeability of the stitched fleece 2 falls in a range from 2200 l/m²s to 2600 l/m²s.

The use of this stitched fleece 2 as substrate 6 leads to an adhesive tape 1 having the properties as shown in the following Table 4, column 4.

In particular, the adhesive tape 1 has an application of adhesive on the substrate 6 in a range from 40 g/m² to 60 g/m² and is 0.25 mm thick. Furthermore, the adhesive tape 1 has an elongation at break in a range from 15% to 30%, preferably of 19%, and a breaking force in a range from 20 N/cm to 30 N/cm, preferably of 25 N/cm. Moreover, the adhesive force on steel is 4.7 N/cm, the adhesive force on a tape back is 6.5 N/cm, and the unrolling force is 5.4 N. In particular, the adhesive tape 1 is easily tearable manually. The noise damping here corresponds to class C, and the abrasion resistance corresponds to class B.

TABLE 4

Overview of adhesive tapes

|  |  | Standard adhesive tape 8551 | Adhesive tape of construction 1 | Adhesive tape of construction 2 | Adhesive tape of construction 3 | Standard adhesive tape 8550 | Adhesive tape of construction 4 |
|---|---|---|---|---|---|---|---|
| Substrate material | g/m² | 65 | 65 | 65 | 65 | 65 | 65 |
| Adhesive type | — | Synthetic rubber | Synthetic rubber | Synthetic rubber | Synthetic rubber | Synthetic rubber | Synthetic rubber |
| Adhesive application | g/m² | 50-100 | 40-60 | 40-60 | 40-60 | 50-100 | 50-100 |
| Thickness | mm | 0.25 | 0.25 | 0.25 | 0.25 | 0.3 | 0.3 |
| Elongation at break | % | 18 | 19 | 17 | 20 | 25 | 28 |
| Breaking force | N/cm | 28 | 25 | 20 | 28 | 45 | 45 |
| Adhesive force steel | N/cm | 4.5 | 4.7 | 4.9 | 4.6 | 5.5 | 6.0 |
| Adhesive force on tape back | N/cm | 7.8 | 6.5 | 6.2 | 7.8 | 8.1 | 8.1 |
| Unrolling force | N | 6.2 | 5.4 | 5.2 | 6.2 | 5.4 | 5.5 |
| Manual tearability | LV 312 | easy | easy | easy | easy | easy | easy |
| Noise-damping class | LV 312 | C | C | C | C | C | C |
| Abrasion-resistance class | LV 312 | A | B | B/C | B/C | B | B/C |

In a second embodiment of the stitched fleece 2 the fibers 3, 4 are preferably stitched with stitching yarns 5 having a linear density of 33 dtex and having a fineness of F 28. In this exemplary embodiment the grammage of the stitched fleece 2 falls in a range between 60 g/m² and 70 g/m². Furthermore, this embodiment of the stitched fleece 2 has an elongation at break in a range of 10% to 20% and a breaking force in a range from 15 N/cm to 40 N/cm, preferably in a range from 20 N/cm to 35 N/cm. The tear resistance has a value of 8,000 mN. Furthermore, the air permeability of the stitched fleece 2 falls in a range from 1800 l/m²s to 2200 l/m²s.

The use of this stitched fleece 2 as substrate 6 leads to an adhesive tape 1 having the properties as shown in Table 4, Column 5.

Here the features listed in table 4 are essential to the invention both individually and in any combination.

The adhesive tape 1 has an application of adhesive on the substrate 6 in a range from 40 g/m² to 60 g/m² and is 0.25 mm thick. Furthermore, the adhesive tape 1 has an elongation at break of preferably 17%, and a breaking force in a range from 15 N/cm to 25 N/cm, preferably of 20 N/cm. Moreover, the adhesive force on steel is 4.9 N/cm, the adhesive force on a tape back is 6.2 N/cm, and the unrolling force is 5.2 N. The adhesive tape 1 is easily tearable manually. The noise damping here corresponds to class C, and the abrasion resistance corresponds to class B or class C.

In both embodiments it has been shown that by increasing the fineness F or reducing the yarn strength of the adhesive tape 1, less adhesive force can arise on the tape back than an adhesive tape of the above-described type of the prior art, which includes a stitched fleece 2 having a lesser fineness F and is this thus more coarsely meshed. Simultaneously an improved adhesive force on steel can advantageously be achieved. These features are advantageously achieved for the inventive adhesive tape 1 with a simultaneous noise damping compared to an adhesive tape of the above-described type and an improved abrasion-resistance class.

In a third embodiment of the stitched fleece 2 the fibers 3, 4 are stitched with stitching yarns 5 having a linear density of 50 dtex and having a fineness of F 28. In this embodiment the grammage of the stitched fleece 2 falls in a range between 60 g/m² and 70 g/m². Furthermore, this embodiment of the stitched fleece 2 has an elongation at break in a range of 15% to 30% and a breaking force in a range from 20 N/cm to 55 N/cm, depending on the type of stitching yarn used. The tear resistance has a value of 18,000 mN. Furthermore, the air permeability of the stitched fleece 2 falls in a range from 1600 l/m2s to 2000 l/m2s.

The use of this stitched fleece 2 as substrate 6 leads to an adhesive tape 1 having the properties as shown in the following Table 4, column 6.

The adhesive tape 1 has an application of adhesive on the substrate 6 in a range from 40 g/m² to 60 g/m² and is 0.25 mm thick. Furthermore, the adhesive tape 1 has an elongation at break of preferably 20%, and a breaking force in a range from 20 N/cm to 36 N/cm, preferably of 28 N/cm. Moreover, the adhesive force on steel is 4.6 N/cm, the adhesive force on a tape back is 7.8 N/cm, and the unrolling force is 6.2 N. The adhesive tape 1 is easily tearable manually. The noise damping here corresponds to class C, and the abrasion resistance corresponds to class B or class C.

Here the adhesive tape 1 including a stitched fleece 2, which includes a stitched stitching yarn 5 of the same yarn strength and greater fineness F than a fleece-stitching yearn of an adhesive tape of the prior art and of the above described type has similar properties, wherein the applied quantity of adhesive can advantageously be significantly reduced. Furthermore, the abrasion resistance can advantageously be increased.

In a fourth embodiment of the stitched fleece 2, stitching yarns 5 are stitched having a linear density of 50 dtex and having a fineness of F 28. In this embodiment the grammage of the stitched fleece 2 falls in a range between 76 g/m2 and 92 g/m2. Furthermore, this embodiment of the stitched fleece 2 has an elongation at break in a range of 20% to 50% and a breaking force in a range from 35 N/cm to 55 N/cm. The tear resistance has a value of 18,000 mN. Furthermore, the air permeability of the stitched fleece 2 falls in a range from 1600 $l/m^2s$ to 2000 $l/m^2s$.

The use of this stitched fleece 2 as substrate 6 leads to an adhesive tape 1 having the properties as shown in the following Table 4, column 8.

The adhesive tape 1 has an application of adhesive on the substrate 6 in a range from 50 g/m2 to 100 g/m2 and is 0.25 mm thick. Furthermore, the adhesive tape 1 has an elongation at break of preferably 28%, and a breaking force in a range from 40 N/cm to 56 N/cm, preferably of 48 N/cm. Moreover, the adhesive force on steel is 6.0 N/cm, the adhesive force on a tape back is 8.1 N/cm, and the unrolling force is 5.5 N. The adhesive tape 1 is easily tearable manually. The noise damping here corresponds to class C, and the abrasion resistance corresponds to class B or class C.

Compared to a known adhesive tape of the above-described type (compare, e.g., column 7 of table 4) the adhesive tape 1 including an inventive more-finely-stitched fleece-stitching yearn 5 has, in particular, an improved elongation at break and breaking force. The adhesive force on steel is also advantageously better compared to adhesive tapes of the prior art and of the above-described type.

While the above description constitutes the preferred embodiment of the present invention, it will be appreciated that the invention is susceptible to modification, variation and change without departing from the proper scope and fair meaning of the accompanying claims.

The invention claimed is:

1. An adhesive tape comprising a substrate including a stitched fleece and an adhesive layer applied to one side of the substrate,
    wherein the stitched fleece is formed from short fibers and long fibers which are stitched with sewing threads, the length of the long fibers being greater than the length of the short fibers,
    wherein all of the long and short fibers in the stitched fleece completely consist of polyester (PES), the proportion of the long fibers is in the range from 60% to 90% and the proportion of short fibers correspondingly is in the range from 40% to 10% based on the weight of the long and short fibers,
    wherein the long fibers have a fiber length (L1) in the range from 60 mm to 120 mm, and the short fibers have a fiber length (L2) in the range from 35 mm to 55 mm,
    wherein the stitching yarns sewing threads are stitched with a fineness of at least F 24,
    wherein the stitched fleece has a thickness ($D_1$) in the range of 0.16 mm to 0.27 mm,
    wherein the stitched fleece has a tear resistance in the range from 8,000 mN to 18,000 mN, an elongation at break in the range from 10% to 50%, and a breaking force in the range from 20 N/cm to 55 N/cm in accordance with standard LV 312;
    wherein the sewing threads are made from filaments with a filament count in the range from 30 to 48;
    wherein the adhesive tape has an abrasion resistance in the range from class B to class C.

2. The adhesive tape according to claim 1, wherein the sewing threads are stitched in the stitched fleece with a fineness in a range from F 24 to F 28.

3. The adhesive tape according to claim 1, wherein the sewing threads are stitched in the stitched fleece with a stitch length in a range from 0.7 mm to 1.7 mm.

4. The adhesive tape according to claim 1, wherein the sewing threads have a linear density in the range from 20 dtex to 76 dtex.

5. The adhesive tape according to claim 1, wherein the stitched fleece has an elongation at break in the range from 20% to 50%-according to the standard LV 312.

6. The adhesive tape according to claim 1, wherein the stitched fleece has a breaking force in the range from 35 N/cm to 55 N/cm according to the standard LV 312.

7. The adhesive tape according to claim 1, wherein the adhesive tape has an elongation at break in the range from 17% to 28% according to the standard LV 312.

8. The adhesive tape according to claim 1, wherein the adhesive tape has a breaking force in the range from 20 N/cm to 48 N/cm according to the standard LV 312.

9. The adhesive tape according to claim 1, wherein the fibers have a linear density in the range from 2 dtex to 4 dtex.

10. The adhesive tape according to claim 1, wherein at least a portion of the sewing threads completely or partially comprise polyester (PES).

11. The adhesive tape according to claim 1, wherein the stitched fleece has a grammage in a range of 60 $g/m^2$ to 92 $g/m^2$.

12. The adhesive tape according to claim 1, wherein the adhesive layer further comprises a pressure-sensitive adhesive.

13. The adhesive tape according to claim 1, wherein the adhesive layer has an application weight in the range from 40 $g/m^2$ to 100 $g/m^2$.

14. The adhesive tape according to claim 12 wherein the pressure-sensitive adhesive comprises a UV-crosslinkable acrylate.

* * * * *